US007557525B2

(12) United States Patent
Nguyen et al.

(10) Patent No.: US 7,557,525 B2
(45) Date of Patent: Jul. 7, 2009

(54) DUAL SWING GATE CONTROL SYSTEM

(75) Inventors: Hung Nguyen, Tallahassee, FL (US); Mayer Robert, Tallahassee, FL (US)

(73) Assignee: GTO, Inc., Tallahassee, FL (US)

( * ) Notice: Subject to any disclaimer, the term of this patent is extended or adjusted under 35 U.S.C. 154(b) by 225 days.

(21) Appl. No.: 11/820,070

(22) Filed: Jun. 18, 2007

(65) Prior Publication Data

US 2008/0309275 A1 Dec. 18, 2008

(51) Int. Cl.
*H02K 41/00* (2006.01)

(52) U.S. Cl. ........................ 318/135; 318/38; 318/101; 318/286; 318/467

(58) Field of Classification Search .................. 318/38, 318/45, 67–68, 101–103, 135, 264–266, 318/282, 286, 466–469; 49/192–193, 118, 49/360; 187/315–317
See application file for complete search history.

(56) References Cited

U.S. PATENT DOCUMENTS

| | | | | |
|---|---|---|---|---|
| 4,186,521 | A * | 2/1980 | Hunter | 49/30 |
| 5,193,307 | A * | 3/1993 | Chupp | 49/123 |
| 5,963,000 | A * | 10/1999 | Tsutsumi et al. | 318/480 |
| 6,943,508 | B2 * | 9/2005 | Morris et al. | 318/38 |
| 7,202,615 | B2 * | 4/2007 | Morris et al. | 318/38 |
| 2006/0086050 | A1 * | 4/2006 | Matsuyama et al. | 49/366 |

* cited by examiner

*Primary Examiner*—Bentsu Ro
*Assistant Examiner*—Thai Dinh
(74) *Attorney, Agent, or Firm*—William H. Hollimon

(57) ABSTRACT

A control system and method for ensuring proper closure of a dual swing gate. The control system employs position sensors for monitoring the position of each gate arm. A "differential position" is maintained between the arms during closing to ensure proper sequencing. The control system regulates the speed of the master arm and the slave arm to ensure that the differential position is maintained throughout the closure process.

13 Claims, 19 Drawing Sheets

NOTES:

Dashed lines are direct Kelvin Connection to current sense resistance – Do not make local gnd connections Components in dashed RED Boxes are omitted for single operator version of board

DUAL SWING GATE CONTROL SYSTEM

BACKGROUND OF THE INVENTION

1. Field of the Invention

This invention relates to the field of access control devices, such as the type that are used to control vehicular traffic. More specifically, the present invention comprises a control system for actuating the opening and closure of dual swing gates.

2. Description of the Related Art

Dual swing gates are common devices used to control vehicular traffic. Dual swing gates are characterized by a pair of swing gates that move in unison. Typically, each gate blocks approximately half of the width of the access point when in the closed position. These gates are commonly used to regulate vehicular access to residences, parking garages, and industrial or commercial areas.

Most dual swing gates are electronically controlled so that an authorized vehicle is permitted to pass through the gate when the authorized vehicle approaches the gate. Various mechanisms are used to regulate the opening of the dual swing gate. Bar code scanners, card readers, infrared motion detectors, and currency counters are all commonly used to send an "open gate" command to a controller. The controller interfaces with a prime mover to open the gate when this signal is received. Motion sensors or sensors embedded in the roadway are often used to provide an "all clear" signal to the controller when the vehicle is clear of the dual swing gate. The controller is then provided with a "close gate" signal after the "all clear" signal is received.

Many dual swing gates employ locking or closing features which help secure the access point. For most locking or closing features to work properly, the swing gates must arrive at the closed position in the correct sequence. FIG. 1 illustrates the correct closure of a dual swing gate. Housing 10 and housing 20 contain motors and control devices for actuating master arm 12 and slave arm 18, respectively. In this instance, slave arm 18 reached its closure position prior to master arm 12. The correct timing allowed electronic lock device 14 to engage electronic lock receiver 16. FIG. 2 illustrates the incorrect closure of a dual swing gate. In this example, master arm 12 reached the closure position prior to slave arm 18. Because the gates closed out of sequence, electronic lock device 14 cannot engage electronic lock receiver 16.

Conventionally, this sequencing problem has been addressed by using a time delay between the movement of one gate (the "master") and the other (the "slave"). The time delay is controlled by the circuitry of a control card that electronically actuates the movement of the master gate and the slave gate. Typically, the fixed time delay is user adjustable via DIP switch or potentiometer. A time delay of approximately four seconds is customary. When the "close gate" command is initiated, the controller first actuates closure of slave arm 18. Once the designated delay time elapses, master arm 12 is actuated. Assuming that both gates are traveling at the same speed, slave arm 18 should reach the closure point before master arm 12. This method is considered "open-loop" control.

There are many problems with this open-loop control protocol. First, the delay time may be insufficient to ensure correct sequencing if the master arm moves faster than the slave arm. Also, the relative speed of the gates may change over time due rendering the original delay time insufficient. The slave arm may have a smaller opening angle than the master arm. For example the slave arm may open to 80 degrees while the master arm opens to 100 degrees. In addition, using extended delay periods to compensate for the potential of aging can cause some to perceive that master gate has stopped working. For example, if the master arm is set to a 4 second delay period and the slave arm takes 2 seconds to close, there will be a period of 2 seconds when neither gate is moving. These control systems are not user friendly since the sequencing of the gates must be observed periodically because of the aforementioned factors which can negatively affect proper sequencing. As a result, may users tend to select the longest delay times that are possible to ensure proper closure. This increases the total time of closure and decreases the security and effectiveness of the access control system.

BRIEF SUMMARY OF THE INVENTION

The present invention comprises a control system and method for ensuring proper closure of a dual swing gate. The control system employs position sensors for monitoring the position of each arm. A "differential position" is maintained between the arms during closing to ensure proper sequencing. The control system regulates the speed of both the master arm and the slave arm to ensure that the differential position is maintained throughout the closure process.

BRIEF DESCRIPTION OF THE SEVERAL VIEWS OF THE DRAWINGS

FIGS. 12A-12B show the schematic for the control card.

REFERENCE NUMERALS IN THE DRAWINGS

| | |
|---|---|
| 10 | housing |
| 12 | master arm |
| 14 | electronic lock device |
| 16 | electronic lock receiver |
| 18 | slave arm |
| 20 | housing |
| 22 | start close command |
| 24 | run slave command |
| 26 | comparison step |
| 28 | don't run command |
| 30 | run master command |
| 32 | comparison step |
| 34 | reduce master speed command |
| 36 | comparison step |
| 38 | stop/run command |
| 40 | comparison step |

-continued

| | |
|---|---|
| 42 | stop command |
| 44 | comparison step |
| 46 | increase master command |
| 48 | linear actuator |
| 50 | linear actuator |

DETAILED DESCRIPTION OF THE INVENTION

The present invention comprises a control system and method for ensuring proper closure of a dual swing gate. Although the proposed control system actuates both the opening and closing processes, the closing process will be considered in greatest detail. The control system employs position sensors for monitoring the position of each gate leaf arm. Each arm is actuated by a motor and, in one embodiment, a linear actuator. As an arm moves from the closed position to the open position, the outboard end of the arm (the end which is in proximity to the opposing gate arm when in the closed position) defines an arc. This arc typically is in the range of 70 degrees to 120 degrees.

The position sensors track the rotation of the motor by observing the motor or the shaft of the linear actuator. Many different position sensors capable of tracking or counting the revolutions of a motor shaft are known in the prior art. By tracking the number of rotations of each motor it is possible for the controller to "know" the position of each arm along its respective arc. The present method maintains a "differential position" between the arms during the closing process to ensure proper sequencing. The control system accomplishes this by regulating the speed of the master arm and the slave arm to ensure that the differential position is maintained throughout the closure process.

Figure 1:
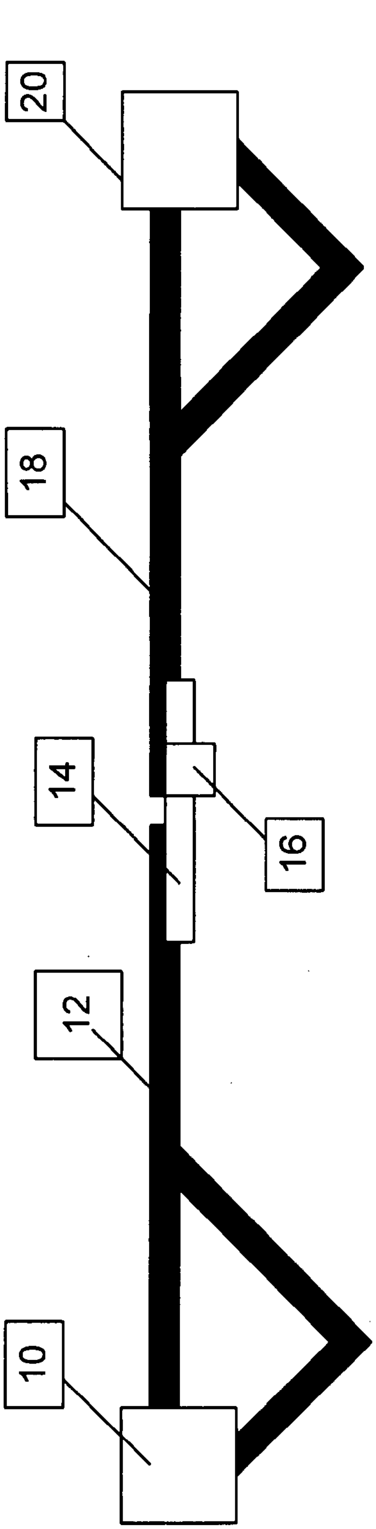
FIG. 1 (Prior Art)
FIG. 1 is a top view, showing a prior art dual swing gate system that is closed properly.
Figure 2:
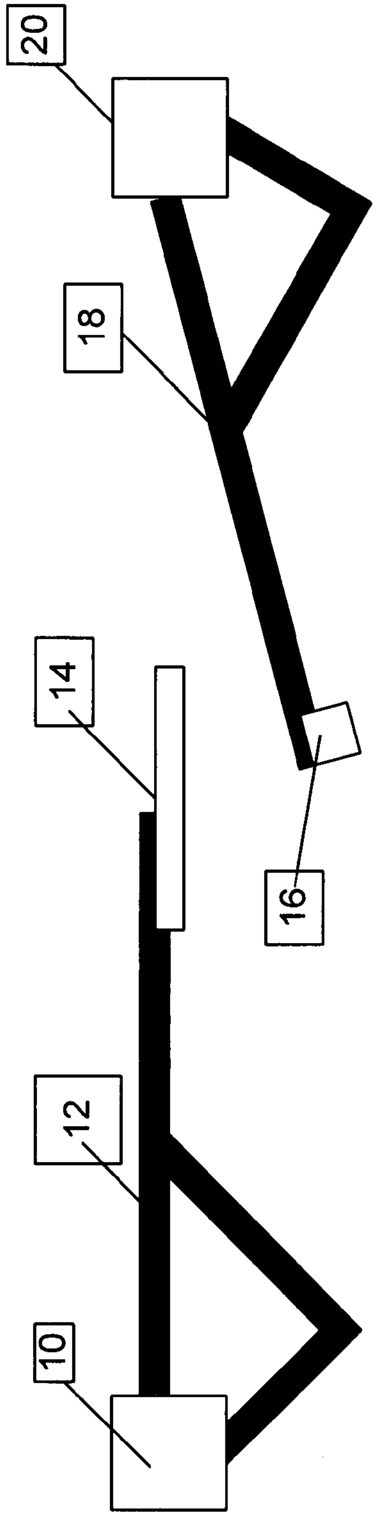
FIG. 2 (Prior Art)
FIG. 2 is a top view, showing a prior art dual swing gate system that is closed improperly.
Figure 3:
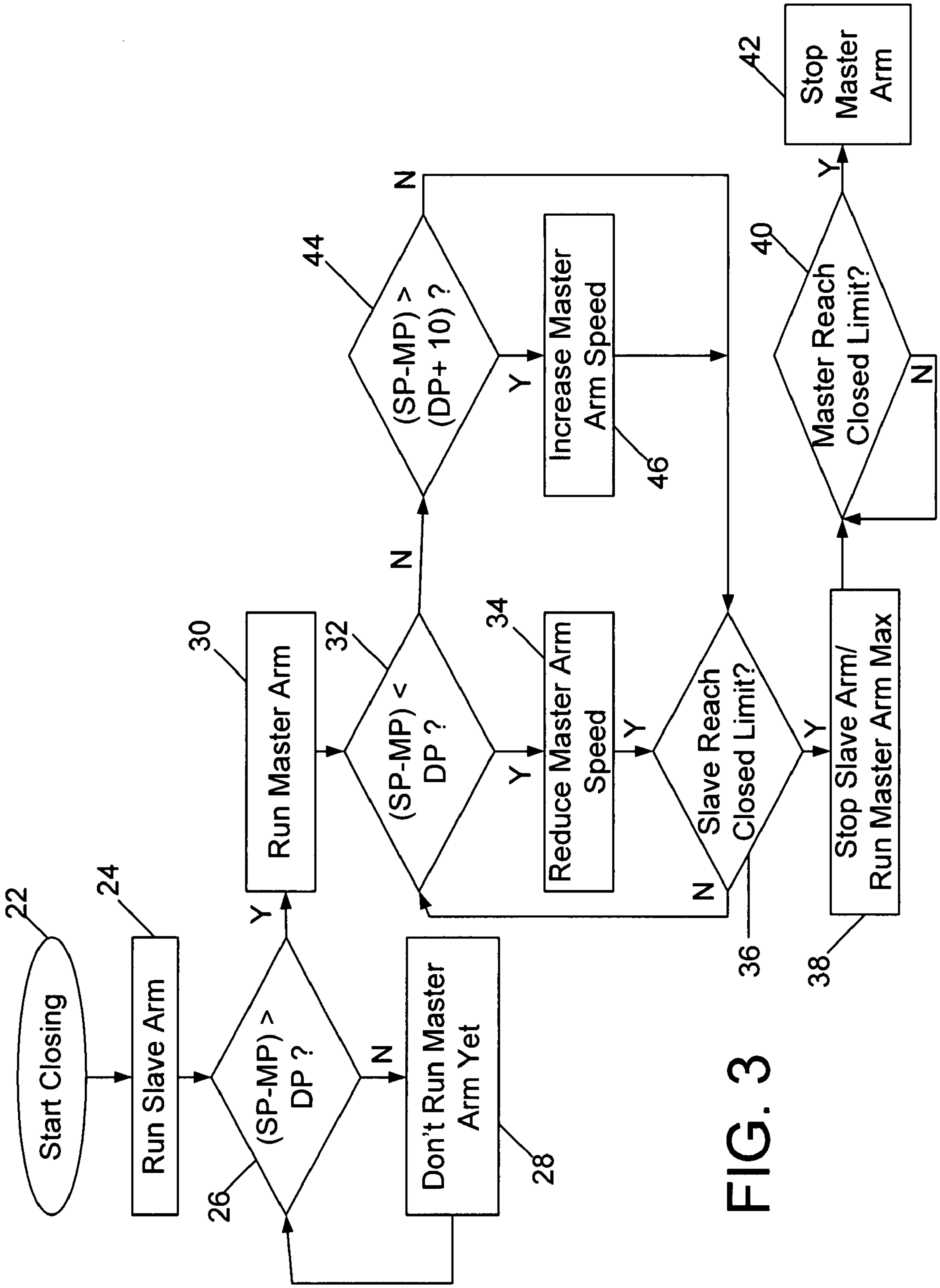
FIG. 3 is a flowchart, showing the process control method.

A method for controlling the closure of a dual swing gate system is illustrated in FIG. 3. A controller initiates the process when start close command 22 is received. Start close command 22 may be automatically transmitted after a period of time has lapsed from the time the gate was opened or it may be transmitted by a sensor when the passageway controlled by the dual swing gate is clear of vehicles. Alternatively, the close command may be user initiated remotely or locally. Upon receipt of start close command 22, the controller generates run slave command 24. This control signal actuates the motor and linear actuator of the slave arm to operate at a preset speed.

The controller next determines whether or not the actual differential position (DP) between the slave position (SP) and the master position (MP) is greater than the designated differential position as indicated by comparison step 26. The designated differential position (DP) represents the preset "lag" that is maintained between the slave arm and the master arm during closing. The actual differential position (SP-MP) is the actual difference in position between the slave arm and the master arm. Those that are skilled in the art will appreciate that values may be assigned for discrete positions along the closing arc (from the fully open position to the fully closed position). For example, when in the fully opened position, the master arm positional value (MP) may have the value of zero (0). When in the closed position, MP may have the value of nine thousand (9000). Likewise, when in the fully opened position, the slave arm positional value (SP) may have the value of zero (0). When in the closed position SP may have the value of nine thousand (9000). The value for DP may be set to any reasonable number. To maintain a three (3) degree lag between the slave arm and the master arm, DP should be set to the value of three hundred (300) in the present example.

If the actual differential position (SP-MP) has not exceed the designated differential position (DP), don't run command 28 is generated. Don't run command 28 triggers a time delay before comparison step 26 is repeated. If after the designated time has lapsed, the actual differential position exceeds the designated differential position, run master command 30 is generated. This command actuates the master arm motor to operate at a preset speed. The master arm motor is preferably set to operate at the same speed as the slave arm motor.

After run master command 30 is transmitted, the controller determines whether the actual differential position is less than the designated differential position as indicated by comparison step 32. If the actual differential position is less than the designated differential position, reduce master speed command 34 is generated. The controller then checks to see if the slave arm has reached the closed position (i.e., it checks to see if MP=9000) as indicated by comparison step 36. If the slave arm has not reached the closed position, the controller returns to comparison step 32 to repeat the process. Those that are skilled in the art will recognize this as a closed loop control process.

If the controller determines that the actual differential position is not less than the designated differential position via comparison step 32, the controller determines whether the actual differential position exceeds a designated differential position range via comparison step 44. In the present example, the differential position range is between 300 and 310 (DP+10). If the actual differential position does not exceed the range, the controller repeats comparison step 36. If the actual differential position exceeds the designated differential position range, increase master command 46 is generated. Increase master command 46 increases the operational speed of the master arm motor. After increase master command 46 is generated, the controller returns to comparison step 36 to determine if the slave arm has reached the closed position.

Once the controller determines that the slave arm has reached the closed position via comparison step 36, stop/run command 38 is generated. This command causes the slave arm motor to stop running and the master arm motor to operate at maximum speed. After stop/run command 38 is generated, the controller determines whether the master arm has reached the closed position (i.e., it checks to see if MP=9000) via comparison step 40. If the master arm has not reached the closed position, the controller waits for a designated amount of time and then repeats comparison step 40. When controller 40 determines that the master arm has reached the closed position, stop command 40 is generated. Stop command 40 causes the master arm motor to stop running.

Figure 4:
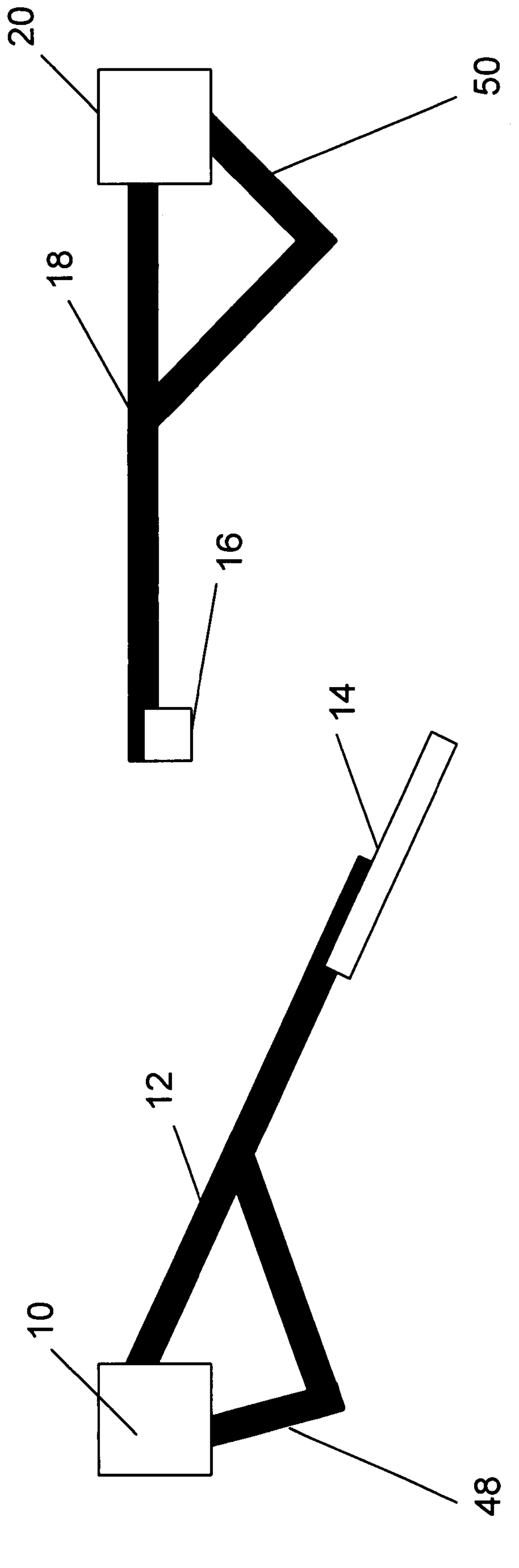
FIG. 4 is a top view, showing a dual swing gate system opening.

FIGS. 4-9 illustrate the sequencing of the opening and closing process. FIG. 4 illustrates the initiation of the opening process. The controller first actuates the master arm motor contained in housing 10. This actuates linear actuator 48 and causes master arm 12 to move from the closed position to a partially open position. Electronic locking device 14 disengages from electronic locking receiver 16 during this phase. Once master arm 12 has attained a designated position, the controller actuates the slave arm motor in housing 20.

Figure 5:
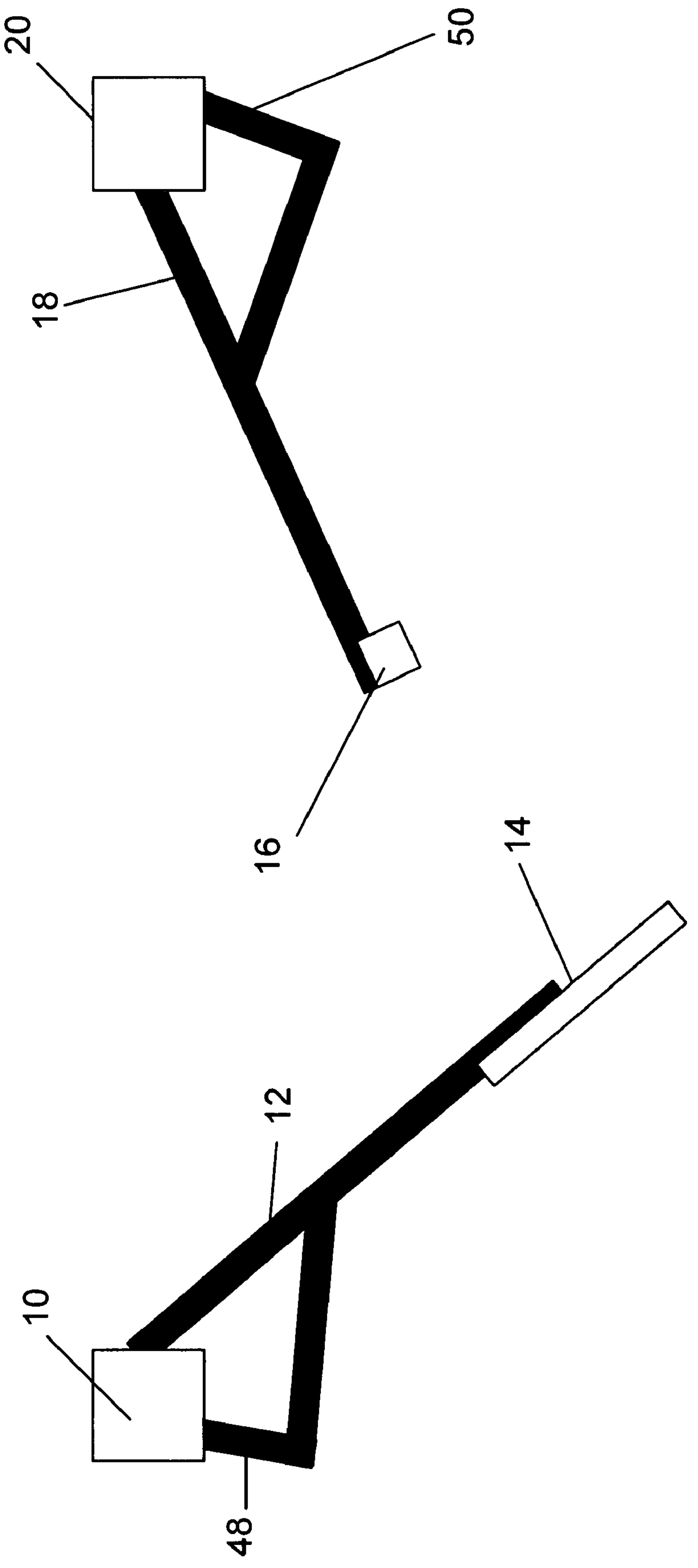
FIG. 5 is a top view, showing a dual swing gate system opening.

Turning to FIG. 5, the dual gate system is shown in a later stage during the opening process. The slave arm motor in housing 20 has been actuated causing linear actuator 50 to move slave arm 18 to a partially open position. The actual differential position represents the difference between the current position master arm 12 relative to the closed position of master arm 12 and the current position of slave arm 18 relative to the closed position of slave arm 18. In the present example, the differential position is much greater than the three (3) degree lag described in relation to the example of FIG. 3.

Figure 6:
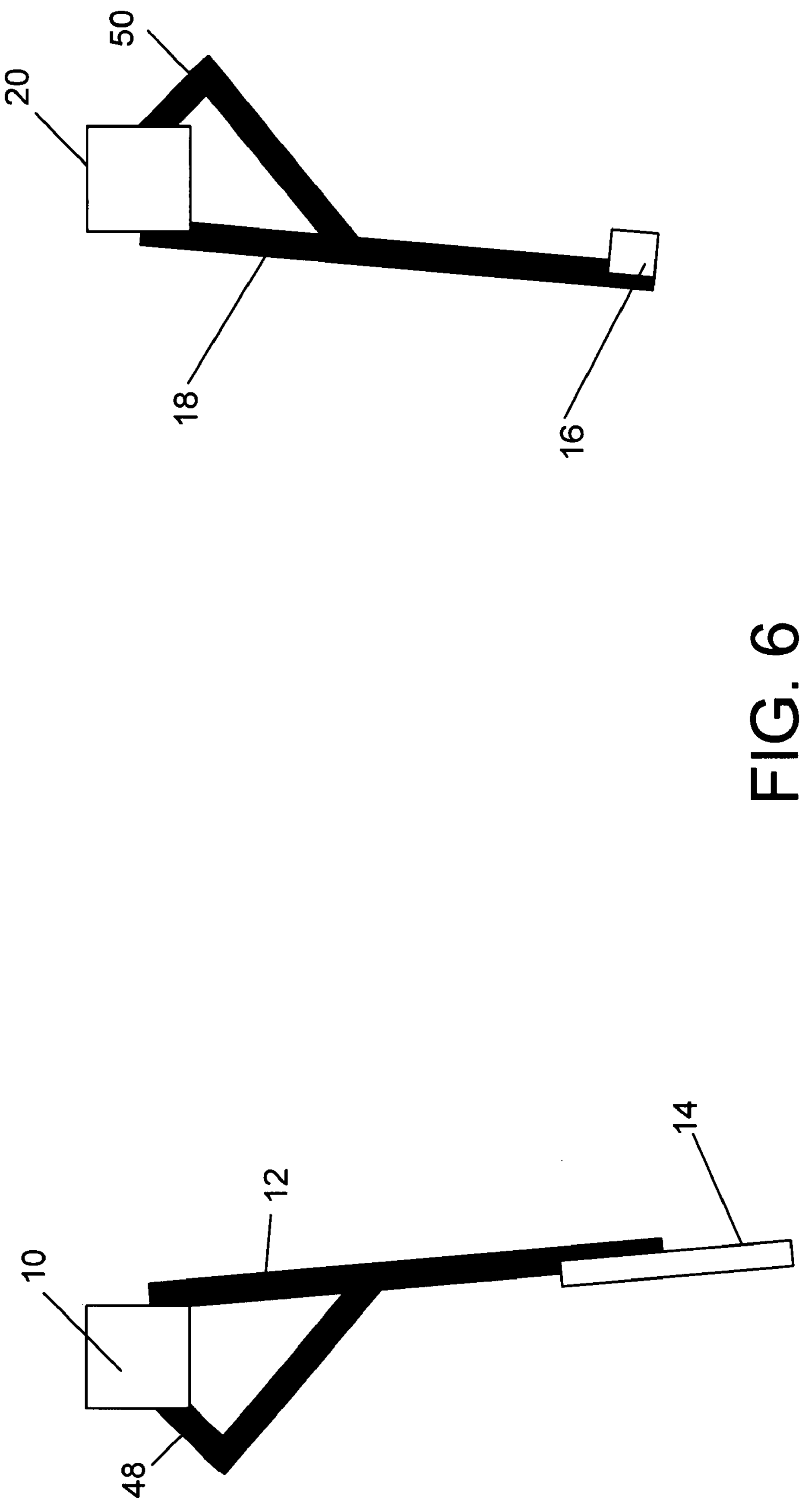
FIG. 6 is a top view, showing a dual swing gate system in the open position.
Figure 7:
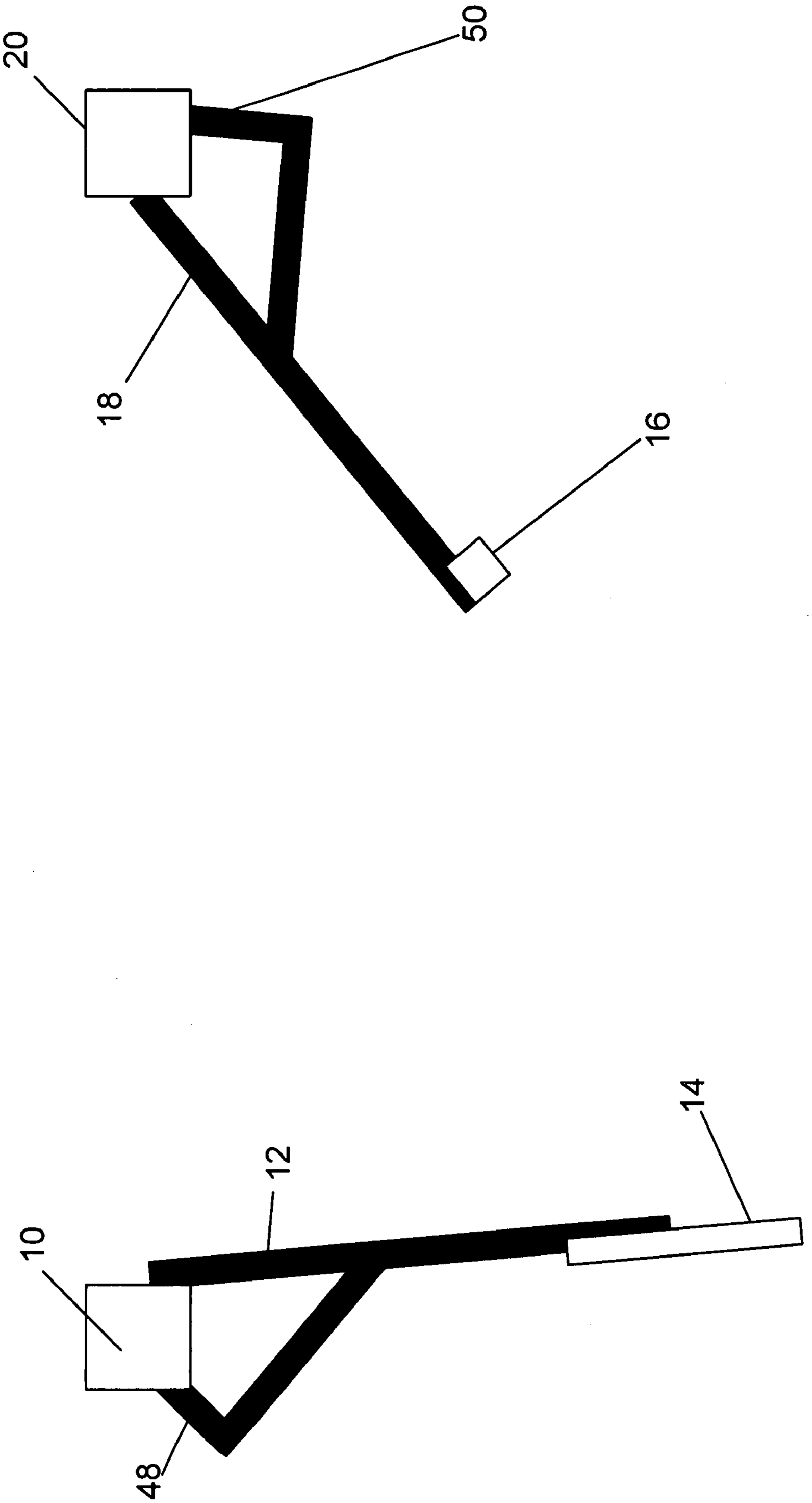
FIG. 7 is a top view, showing a dual swing gate system closing.

FIG. 6 shows the dual swing gate system in the fully open position. Once the controller receives a start close command, the controller actuates the slave arm motor to initiate the closing process as described previously. Turning to FIG. 7, the reader will note that slave arm 18 has changed position while master arm 12 has remained idle. Once the actual differential position reaches the designated differential position, the controller actuates the master arm motor to initiate the closing of master arm 12.

Figure 8:
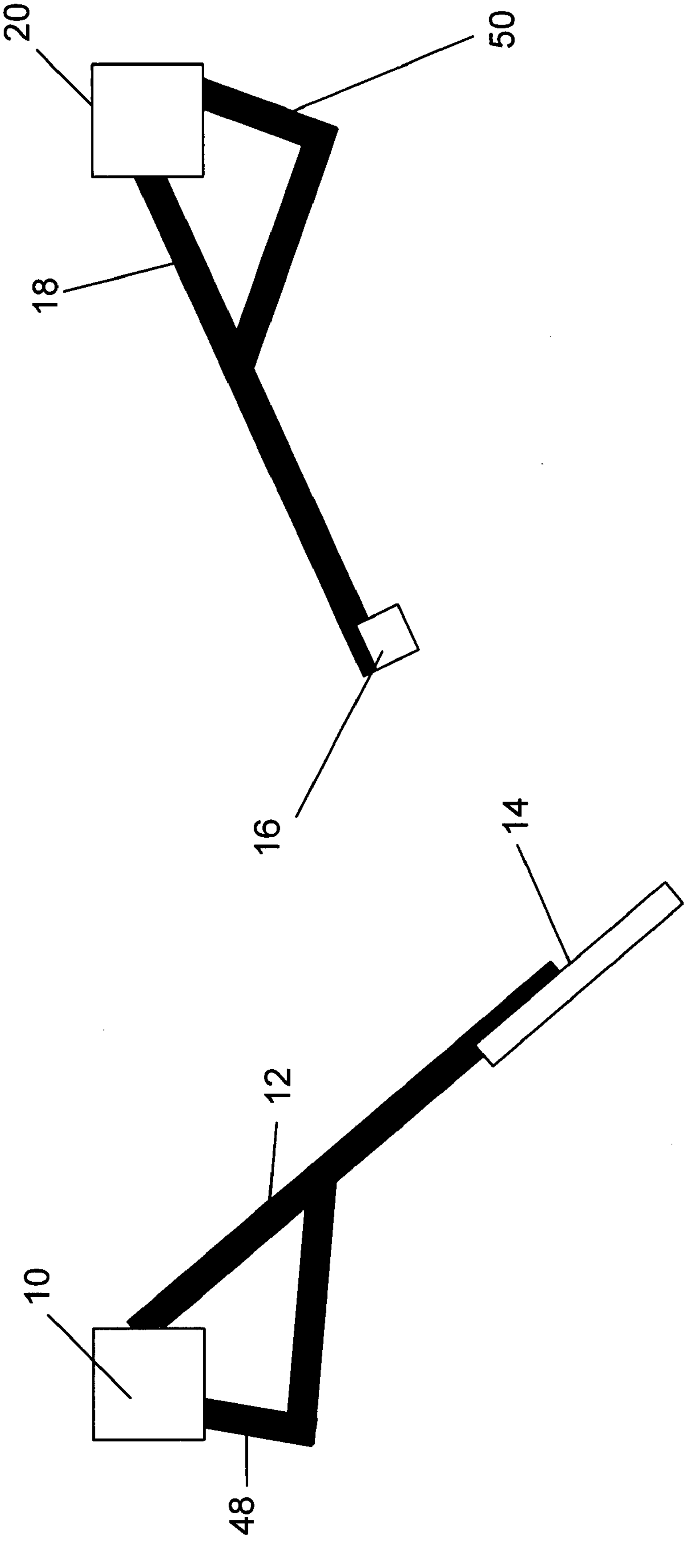
FIG. 8 is a top view, showing a dual swing gate system closing.
Figure 9:
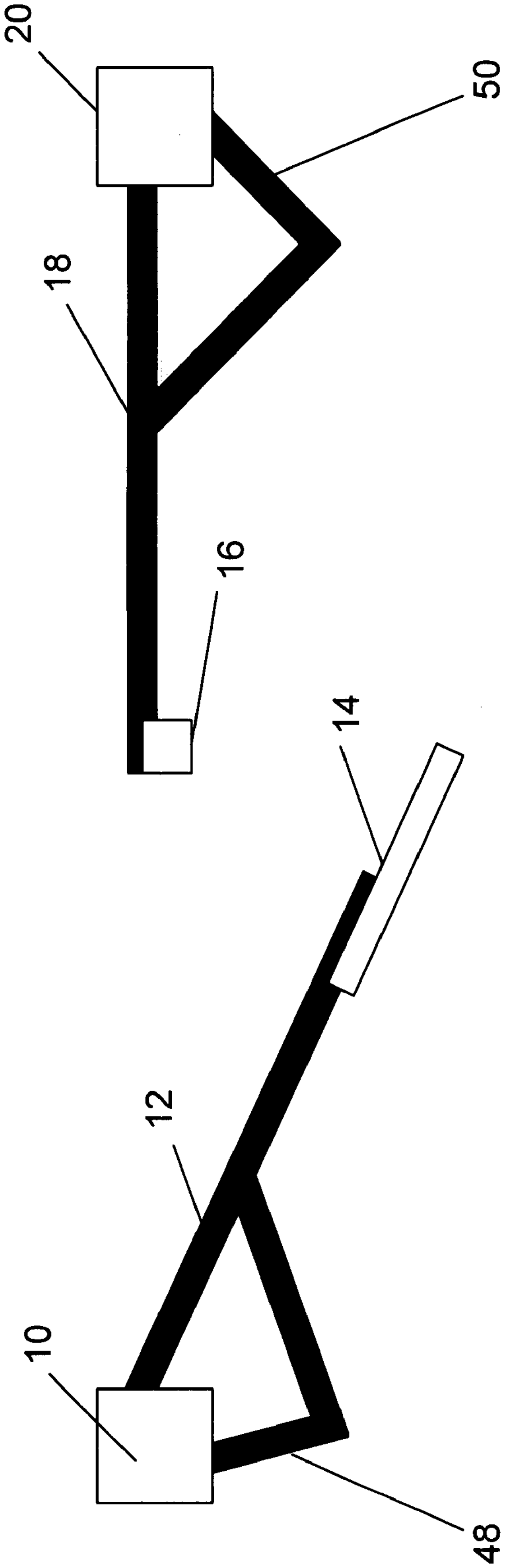
FIG. 9 is a top view, showing a dual swing gate system closing.
Figure 10:
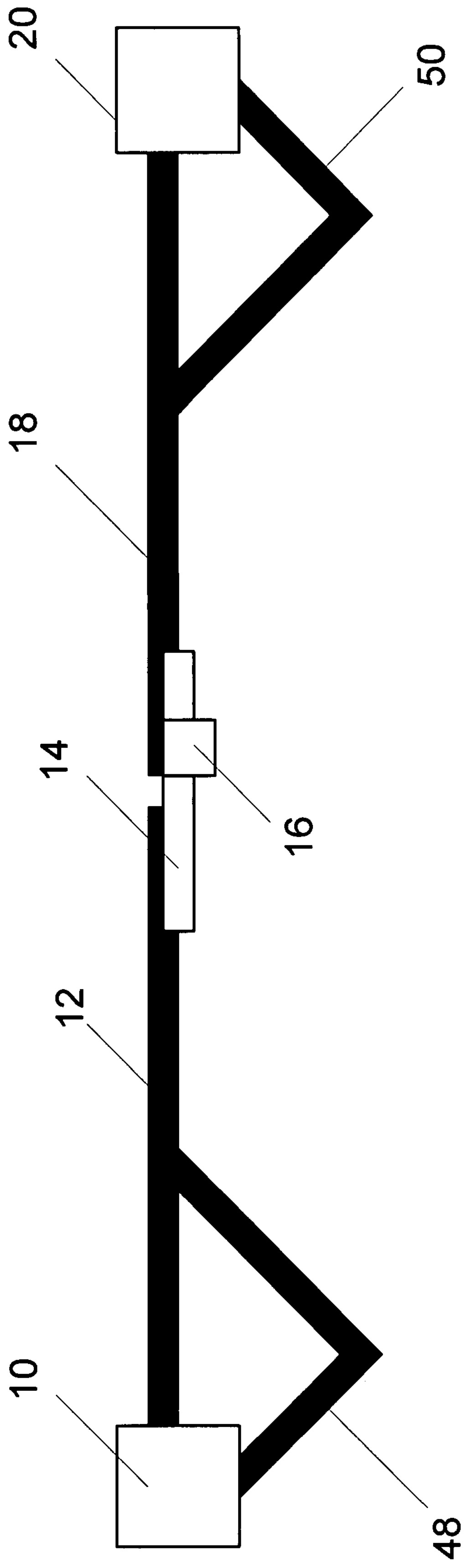
FIG. 10 is a top view, showing a dual swing gate system in the closed position.
Figure 11A:
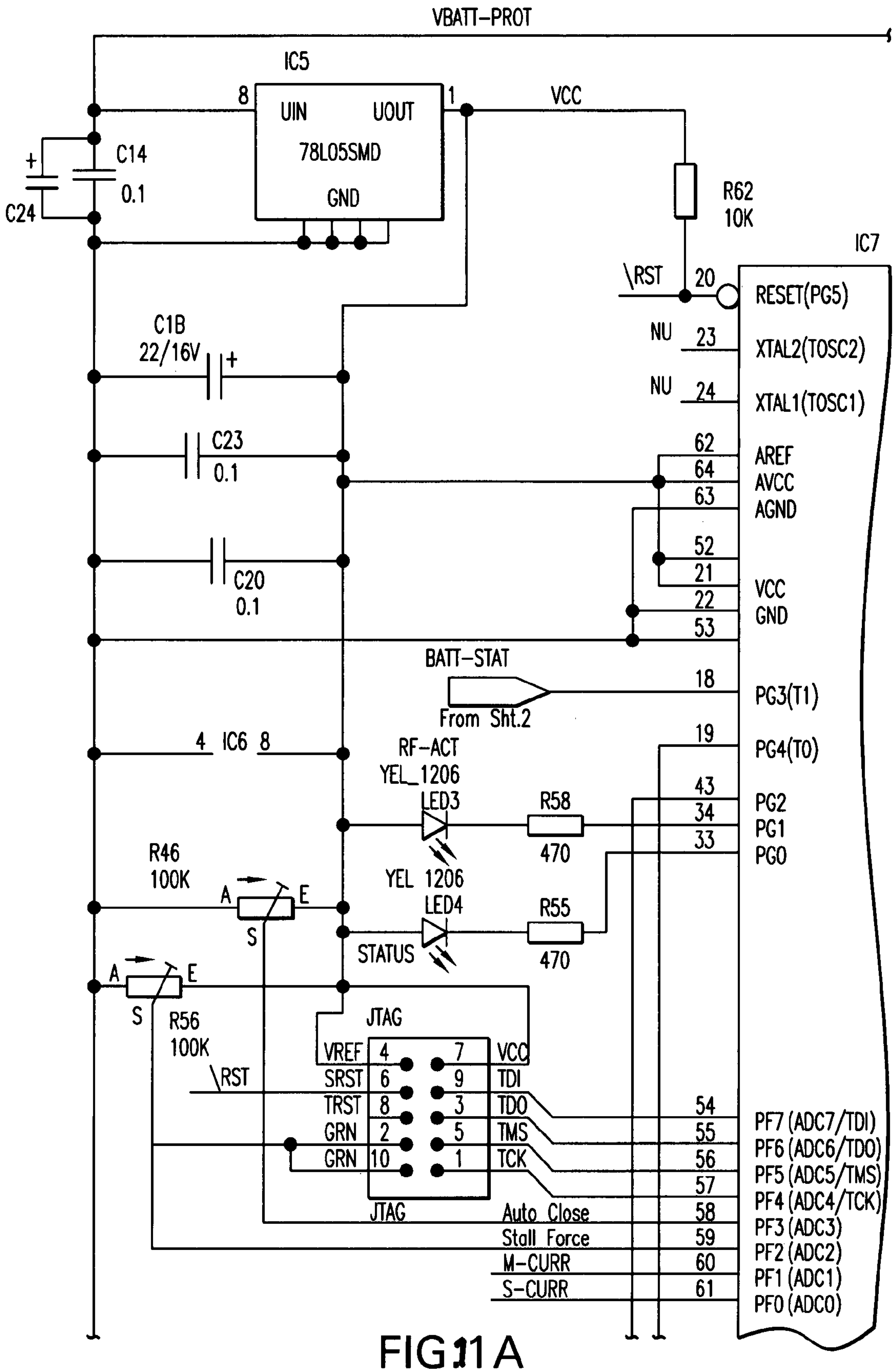
FIGS. 11A-11H show the schematic for the control card.
Figure 11B:
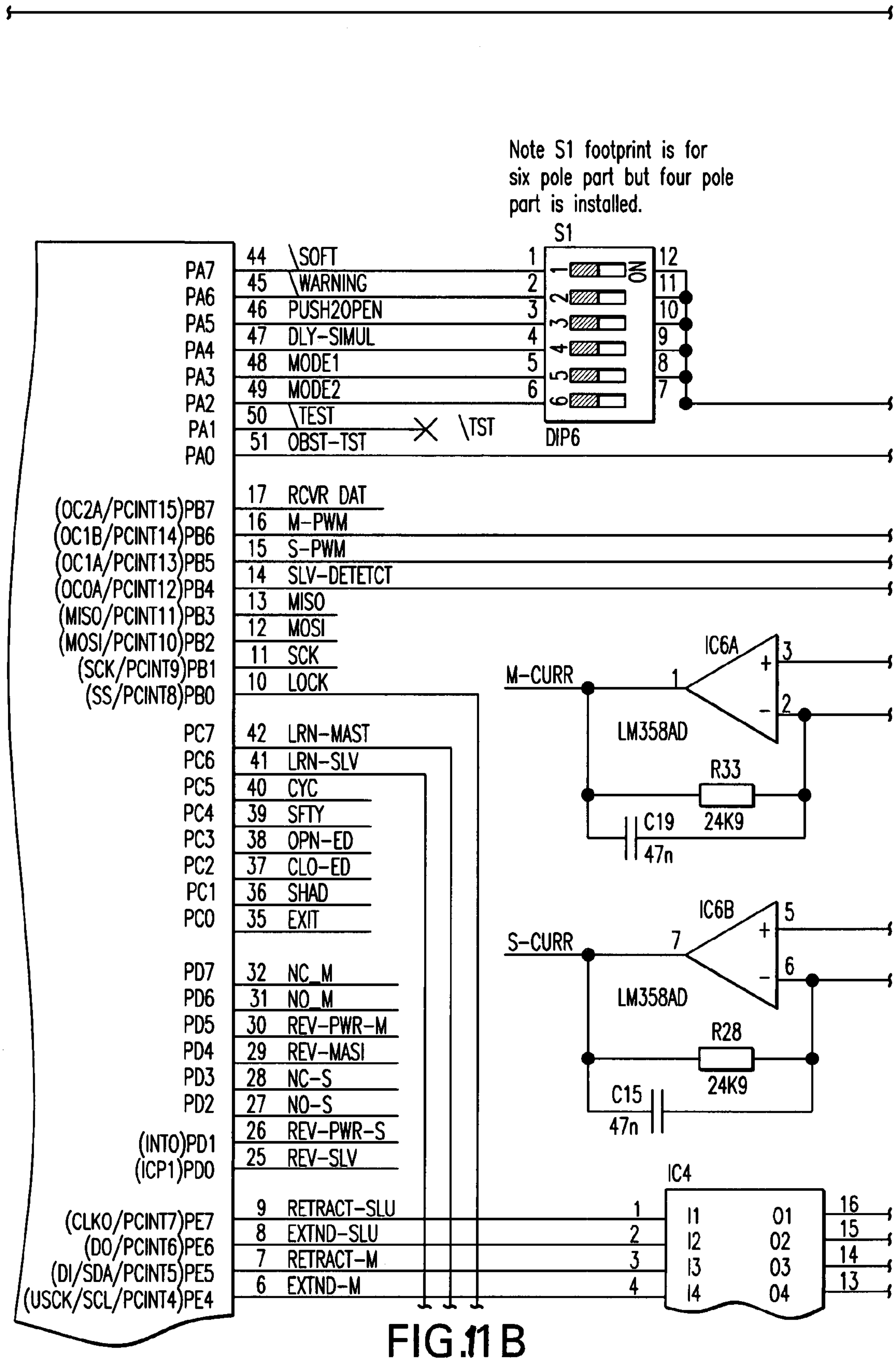
Figure 11C:
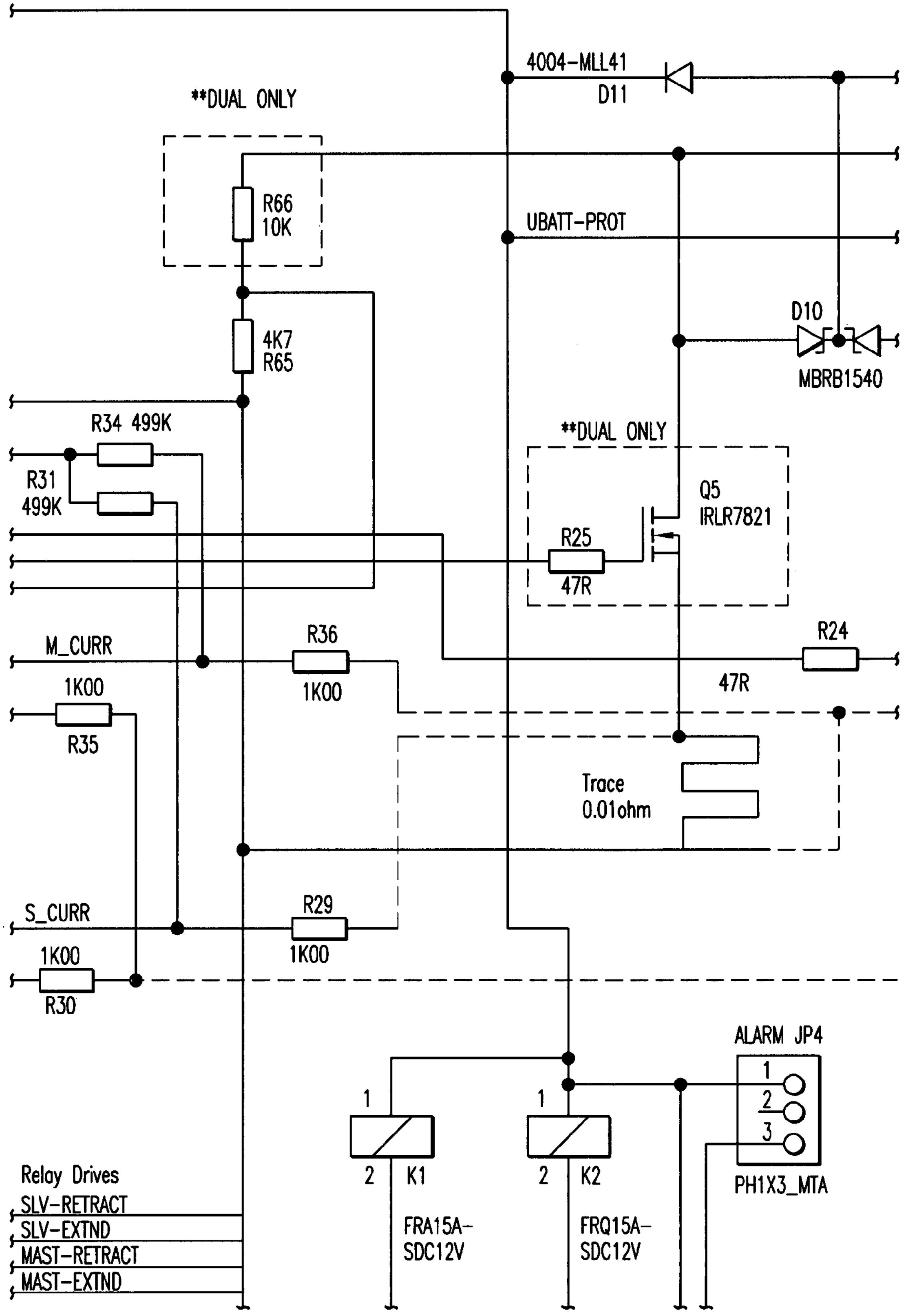
Figure 11D:
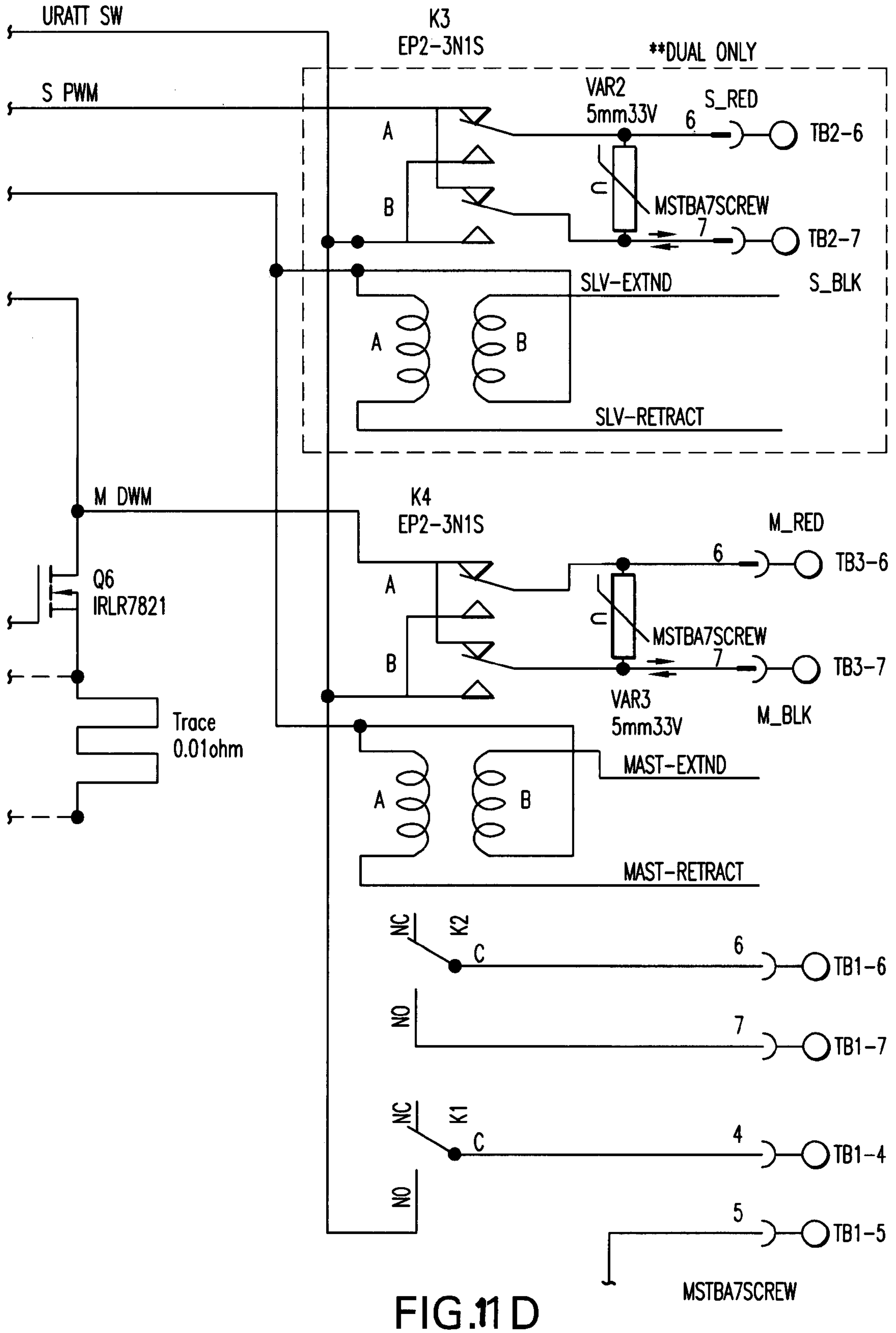
Figure 11E:
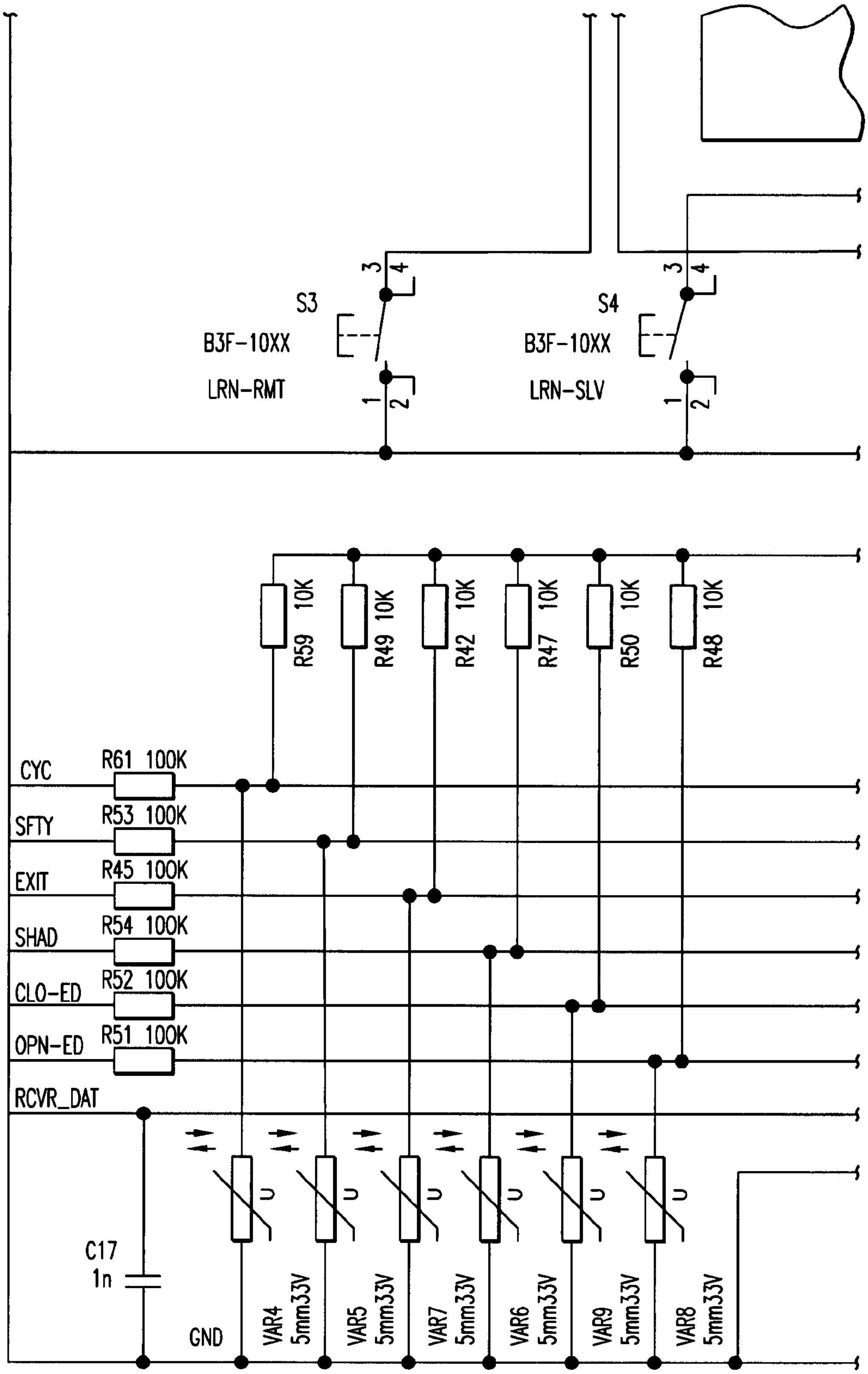
Figure 11F:
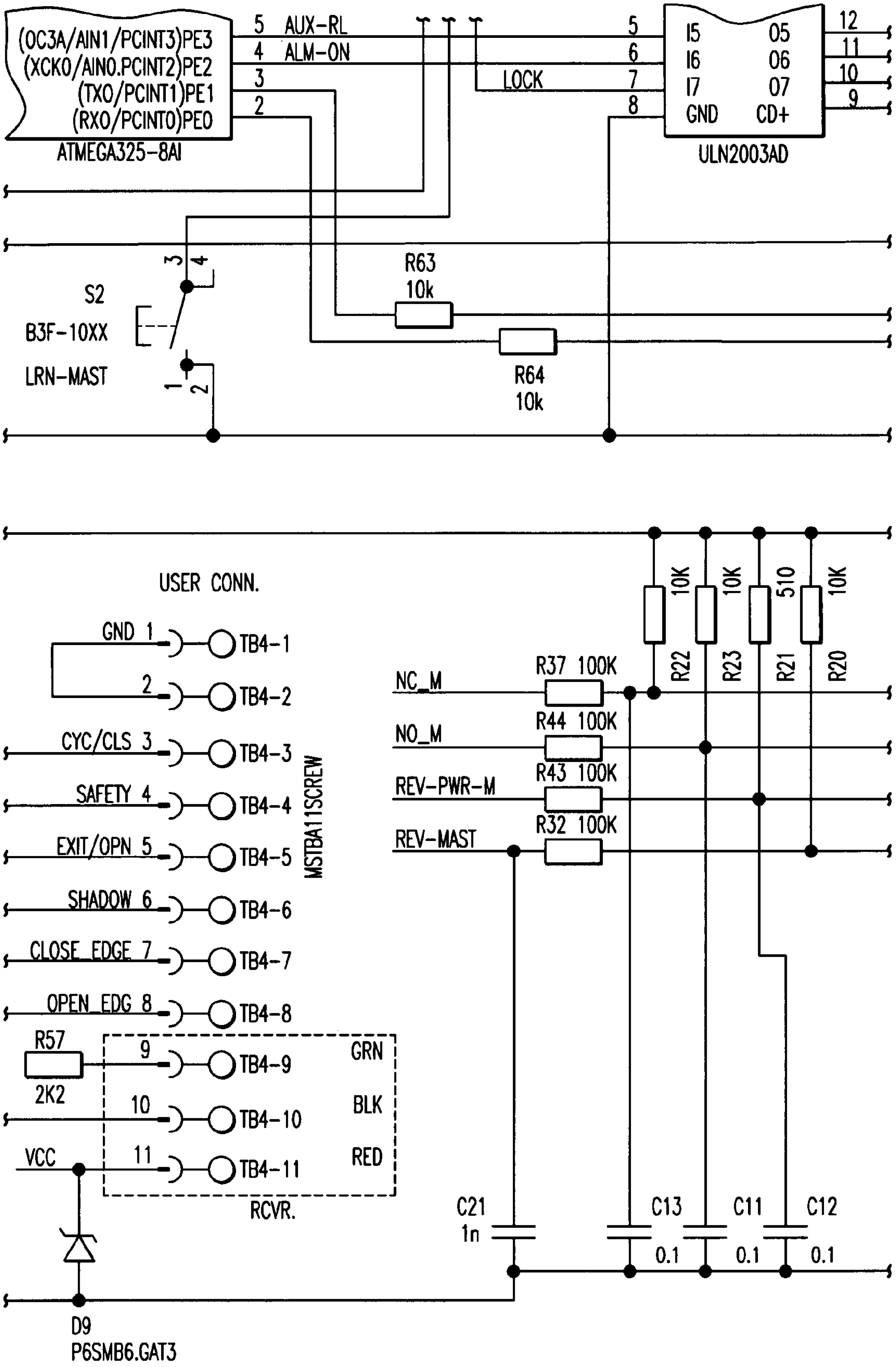
Figure 11G:
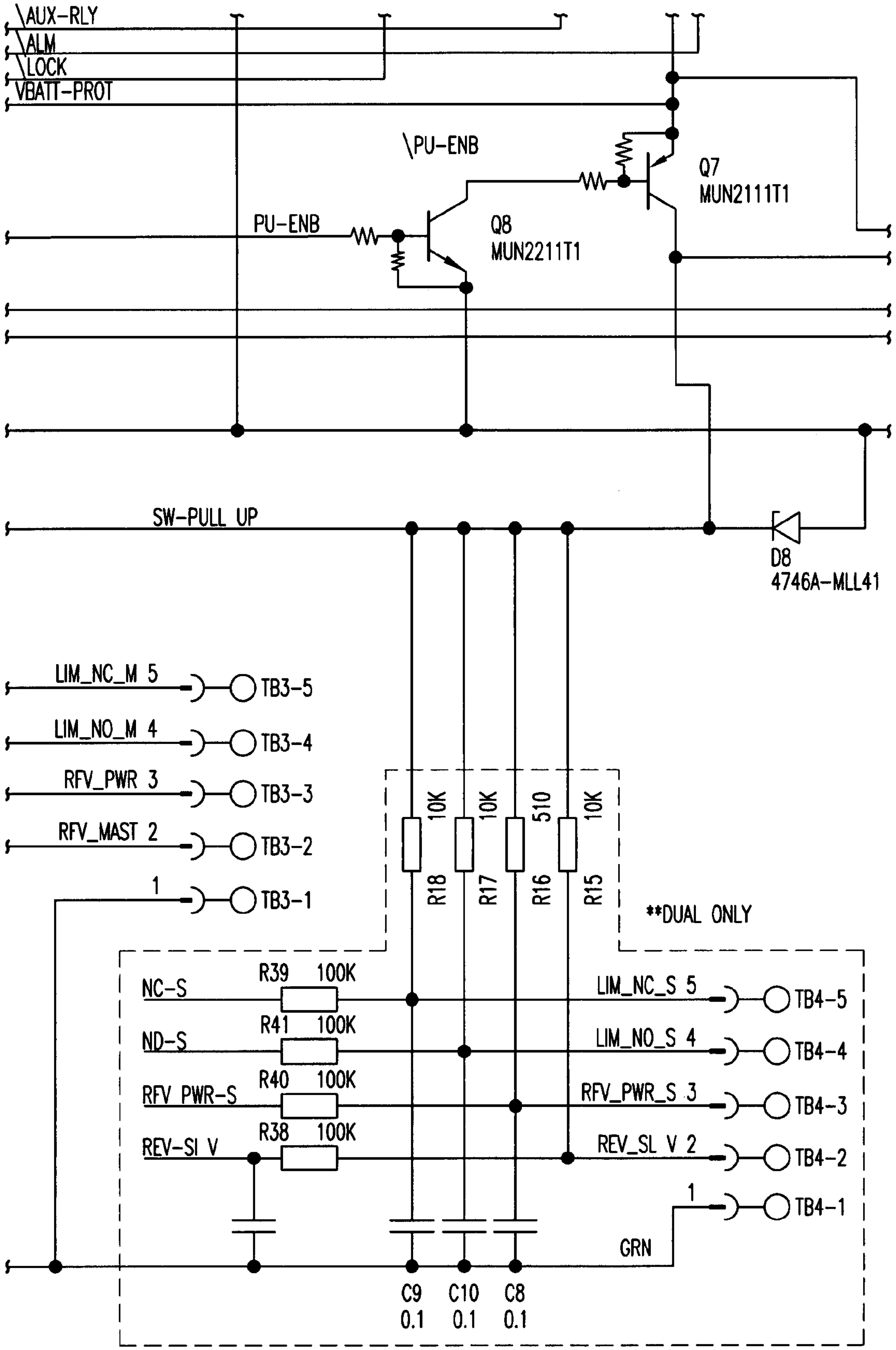
Figure 11H:
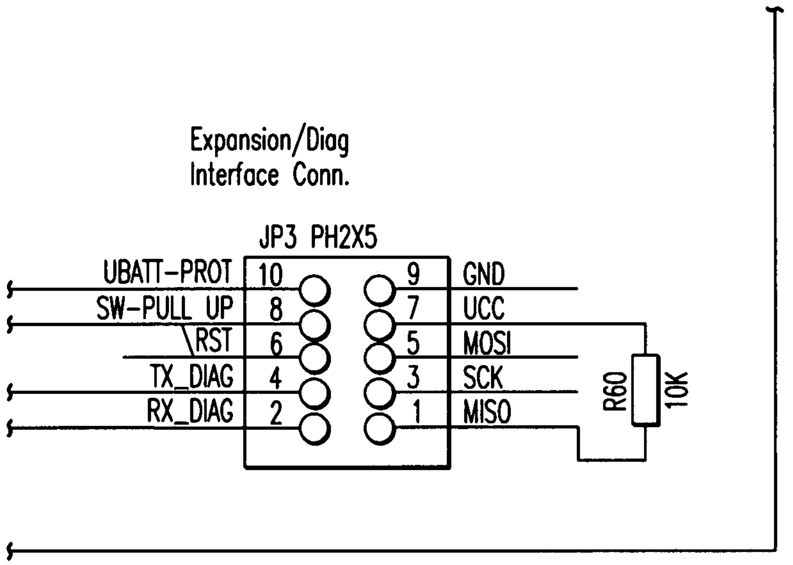
Figure 2A:
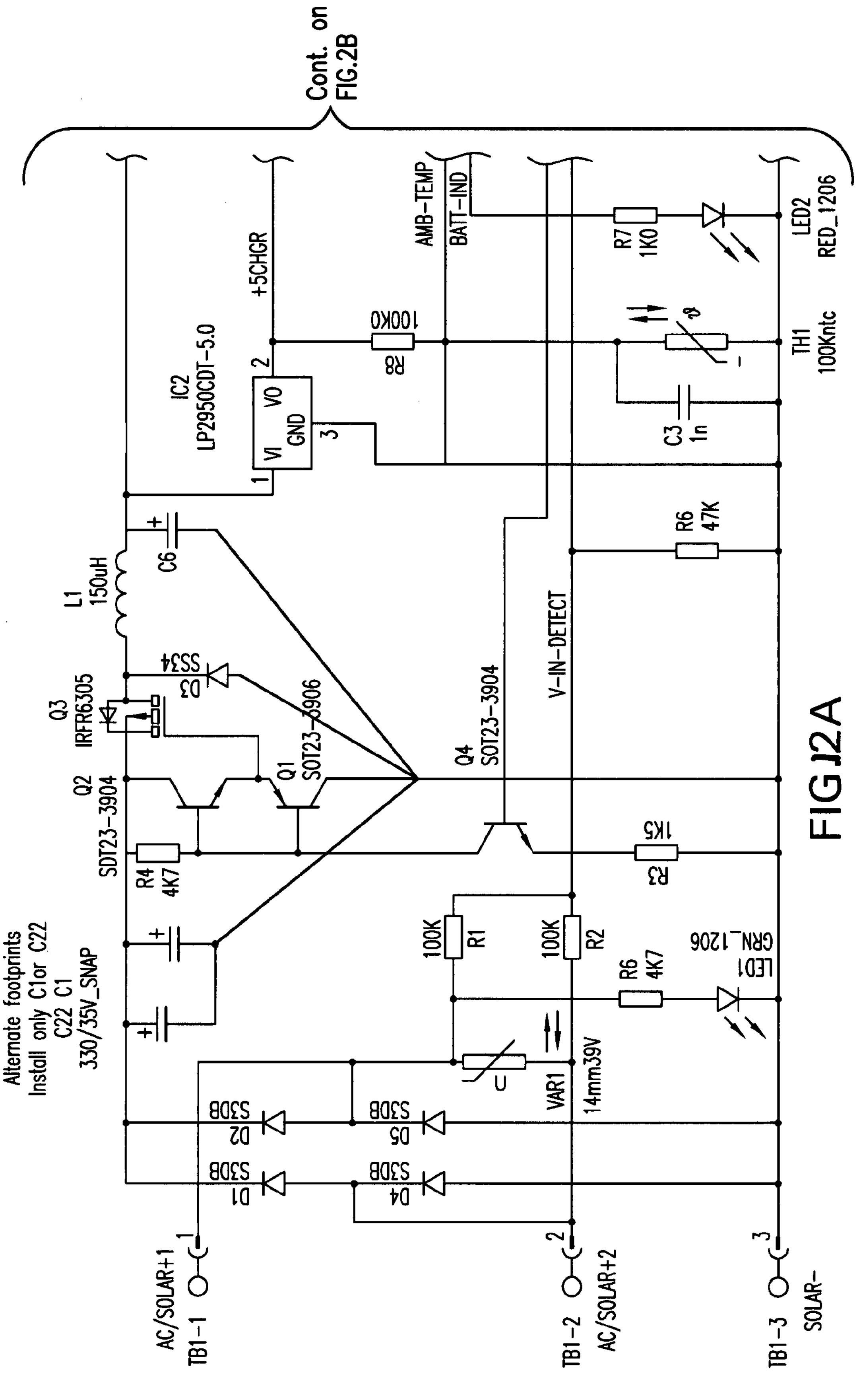
Figure 2B:
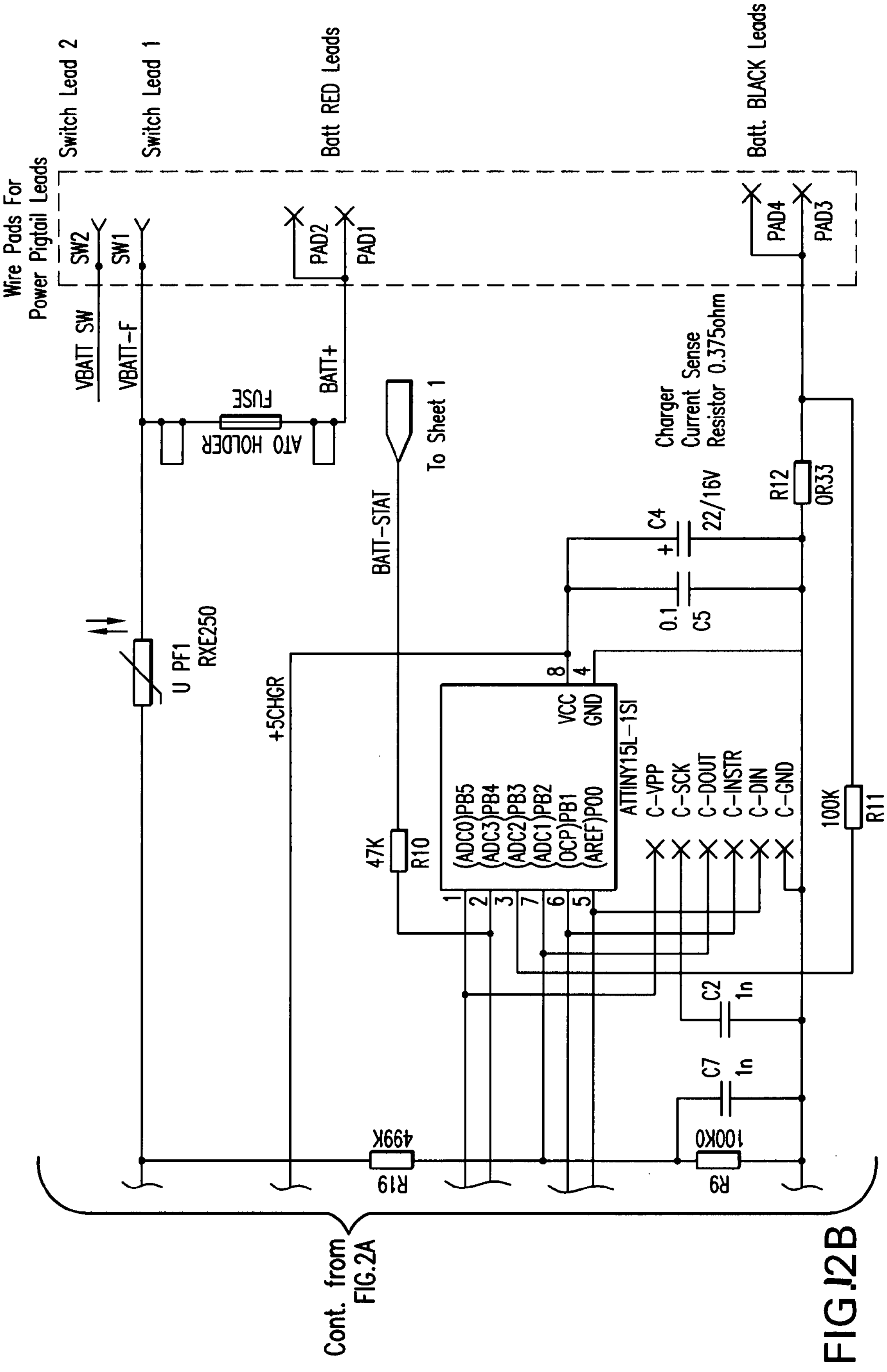

Turning to FIG. 8 and then to FIG. 9, the reader will note that a near constant differential position is maintained between master arm 12 and slave arm 18 during the closing process. With reference to FIG. 9, the controller arrests the slave arm motor when slave arm 18 reaches the closed position as shown. The controller then actuates the master arm motor which drives linear actuator 48 to operate at maximum speed. It should be noted that a "soft close" feature could be added to slow the movement of master arm 12 immediately before it reaches the closed position shown in FIG. 10 thus minimizing the impact of the collision between electronic locking device 14 and electronic lock receiver 16.

FIGS. 11A-J and 12A-B provide schematics for the design of a control card capable of implementing the aforementioned control process.

The preceding description contains significant detail regarding the novel aspects of the present invention. It should not be construed, however, as limiting the scope of the invention but rather as providing illustrations of the preferred embodiments of the invention. As an example, many different actuation mechanisms other than linear actuators may be used to open and close master arm 12 and slave arm 18. Thus, the scope of the invention should be fixed by the following claims, rather than by the examples given.

I claim:

1. A control system for a dual swing gate, said dual swing gate having a master arm, a slave arm, a first linear actuator for actuating said master arm, a second linear actuator for actuating said slave arm, a first motor operatively attached to said first linear actuator so that said first motor drives said first linear actuator, a second motor operatively attached to said second linear actuator so that said second motor drives said linear actuator, said master arm and said slave arm each configured to pivot between an open position and a closed position when actuated by said first linear actuator and said second linear actuator, said control system comprising:

a. a first position sensor configured to observe the position of said master arm;

b. a second position sensor configured to observe the position of said slave arm;

c. a controller configured to actuate said first linear actuator and said second linear actuator during a closure process, said controller further configured to receive position data from said first position sensor and said second position sensor, wherein said controller is configured to determine the differential position of said master arm and said slave arm during said closure process and maintain a designated differential position between said master arm and said slave arm during said closure process so that said slave arm reaches said closed position before said master arm.

2. The control system of claim 1, wherein said first position sensor observes said position of said master arm by sensing the revolutions of said first motor and wherein said second position sensor observes said position of said slave arm by sensing the revolutions of said second motor.

3. The control system of claim 1, wherein said controller maintains a differential position during the closure process by controlling the relative speed of said first motor and said second motor.

4. The control system of claim 1, wherein said controller employs a closed control loop process to maintain said differential position, wherein during said closed control loop process said controller determines whether said differential position is within a defined range.

5. The control system of claim 4, wherein if when employing said closed control loop process said controller determines said differential position is not within said defined range, said controller causes said second motor to operate faster than said first motor.

6. The control system of claim 1, wherein when initiating said closure process, said controller actuates said second linear actuator before actuating said first linear actuator, and said controller actuates said first linear actuator only after a designated time has lapsed from the time said second linear actuator was actuated.

7. The control system of claim 1, said controller further configured to control an opening process, wherein during said opening process said controller actuates said first linear actuator before actuating said second linear actuator.

8. A method for controlling the closure of a dual swing gate, said dual swing gate having a master arm, a slave arm, a first linear actuator for actuating said master arm, a second linear actuator for actuating said slave arm, a first motor operatively attached to said first linear actuator so that said first motor drives said first linear actuator, a second motor operatively attached to said second linear actuator so that said second motor drives said linear actuator, said master arm and said slave arm each configured to pivot between an open position and a closed position when actuated by said first linear actuator and said second linear actuator, said method comprising:

a. sensing the current position of said master arm;

b. sensing the current position of said slave arm;

c. determining the differential position between said master arm and said slave arm, said differential position representing the difference between the current position of said master arm relative to said closed position of said master arm and the current position of said slave arm relative to said closed position of said slave arm;

d. comparing the determined differential position with a designated differential position range; and e. adjusting the speed of one of said first motor and said second motor if said determined differential position is outside said designated differential position range.

9. The method of claim 8, further comprising the step of providing a first position sensor configured to sense the position of said master arm and a second position sensor configured to sense the position of said slave arm.

10. The method of claim 9, wherein said first position sensor observes said position of said master arm by sensing the revolutions of said first motor and wherein said second position sensor observes said position of said slave arm by sensing the revolutions of said second motor.

11. The method of claim 8, further comprising the step of providing a controller, wherein said controller employs a closed control loop process to maintain said differential position, wherein during said closed control loop process said controller determines whether said differential position is within said designated differential range.

12. The method of claim 11, wherein when initiating said closure process, said controller actuates said second linear actuator before actuating said first linear actuator, and said controller actuates said first linear actuator only after a designated time has lapsed from the time said second linear actuator was actuated.

13. A control system for controlling the opening and closing of a gate system, said gate system having a slave gate element and a master gate element, wherein each of said gate elements is rotatable about an axis located at a pinned end of each of said gate elements and whereby rotation of said gate elements about said axes causes a free end of each gate element to define an arc of rotation, said control system comprising:

a. a first sensor, said first sensor capable of determining a position of said slave gate element along said slave gate element's arc of rotation;

b. a second sensor, said second sensor capable of determining a position of said master gate element along said master gate element's arc of rotation;

c. a controller in communication with said sensors and capable of comparing said slave gate element's position along said slave gate element's arc of rotation with said master gate element's position along said master gate element's arc of rotation to determine a differential position between said gate elements, said controller further capable of adjusting a rate of rotation of said slave gate element and a rate of rotation of said master gate element such that a preselected differential position between said gate elements is maintained.

* * * * *